United States Patent [19]

Geisler, Jr.

[11] 4,322,925
[45] Apr. 6, 1982

[54] MOBILE STRUCTURE

[76] Inventor: Alfred J. Geisler, Jr., Rte. #1, P.O. Box 295A, Hampshire, Ill. 60140

[21] Appl. No.: 891,882

[22] Filed: Mar. 30, 1978

[51] Int. Cl.$^3$ .......................... E04B 1/34; E04H 1/12
[52] U.S. Cl. ........................................ 52/143; 52/573; 119/16; 403/169; 403/217
[58] Field of Search ............... 52/143, 573; 403/2,112, 403/217, 388, 169; 119/16

[56] References Cited

U.S. PATENT DOCUMENTS

| | | | |
|---|---|---|---|
| 1,302,652 | 5/1919 | Gilbert | 403/217 X |
| 1,740,277 | 12/1929 | Szilagyi | 119/15.7 |
| 2,613,966 | 10/1952 | Hocher | 403/217 |
| 3,285,644 | 11/1966 | Tomek | 52/573 X |
| 3,406,931 | 10/1968 | Notbohm | 248/646 |
| 3,552,698 | 1/1971 | Kinney | 403/2 |
| 3,640,557 | 2/1972 | Nute, Jr. et al. | 403/2 |
| 3,724,424 | 4/1973 | Benjamin | 119/16 |
| 3,755,980 | 9/1973 | Weidlinger | 52/573 X |
| 4,018,054 | 4/1977 | Standley | 403/2 X |
| 4,126,403 | 11/1978 | Sweeney et al. | 403/2 |

FOREIGN PATENT DOCUMENTS

| | | | |
|---|---|---|---|
| 2111532 | 9/1971 | Fed. Rep. of Germany | 403/217 |
| 2316395 | 1/1977 | France | 403/217 |
| 368925 | 6/1963 | Switzerland | 403/217 |
| 818995 | 8/1959 | United Kingdom | 52/173 |
| 993928 | 6/1963 | United Kingdom | 16/18 A |

*Primary Examiner*—Alfred C. Perham
*Attorney, Agent, or Firm*—Bianchi & White

[57] ABSTRACT

A mobile structure is provided which comprises flexible joint assemblies with increased flexibility in a vertical direction and increased rigidity in the horizontal direction to facilitate towing over uneven terrain and further comprising free wheeling dish-like castor assemblies supporting the structure.

2 Claims, 10 Drawing Figures

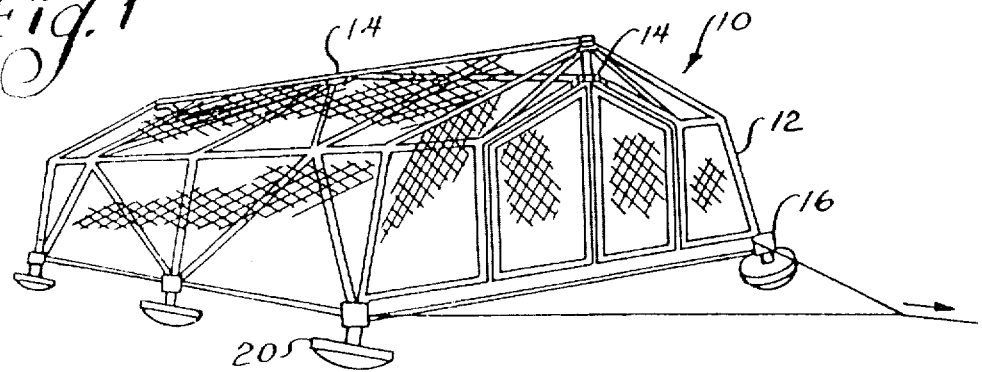
Fig. 1
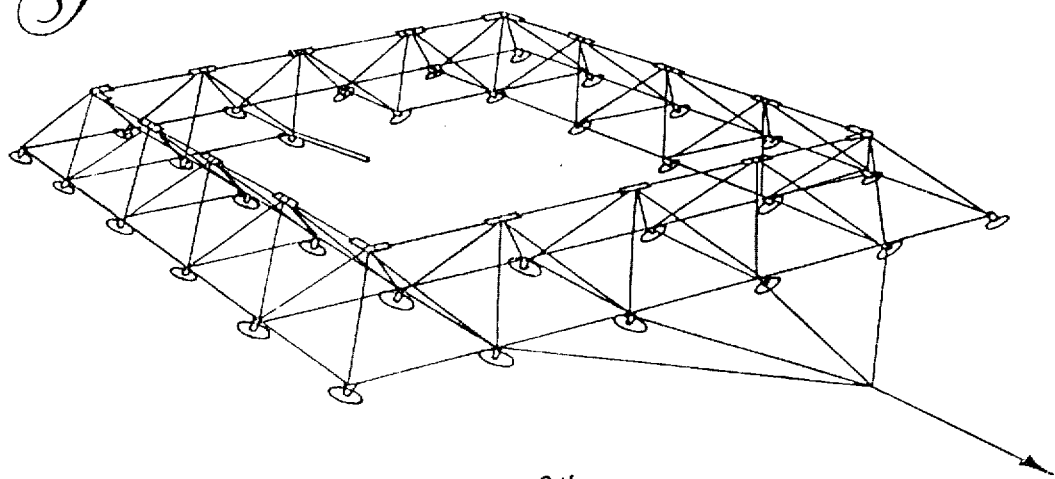
Fig. 2
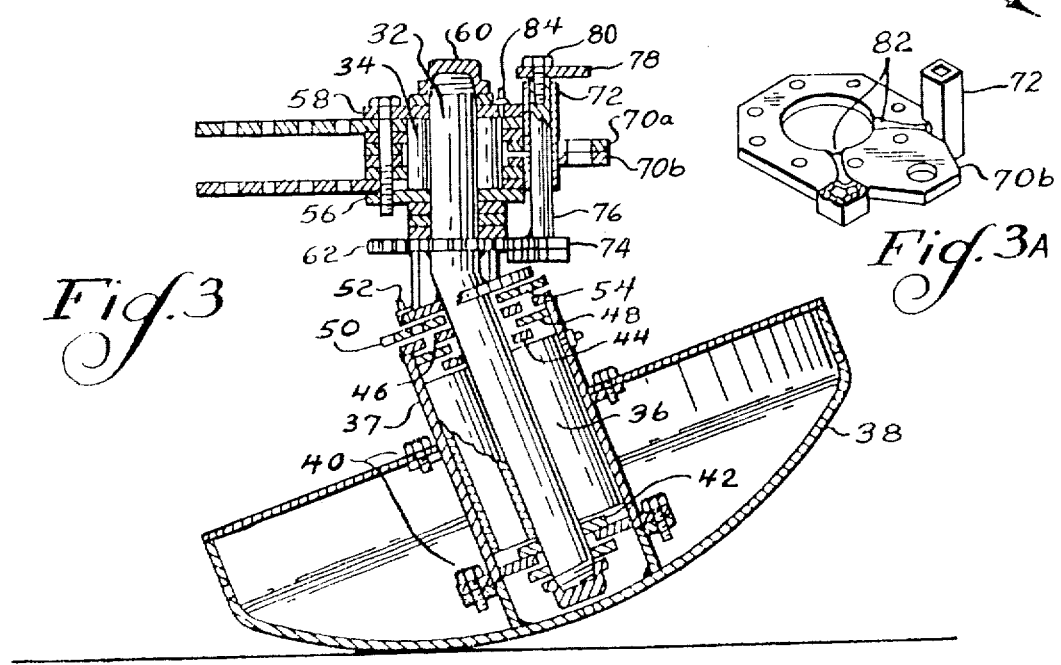
Fig. 3
Fig. 3A

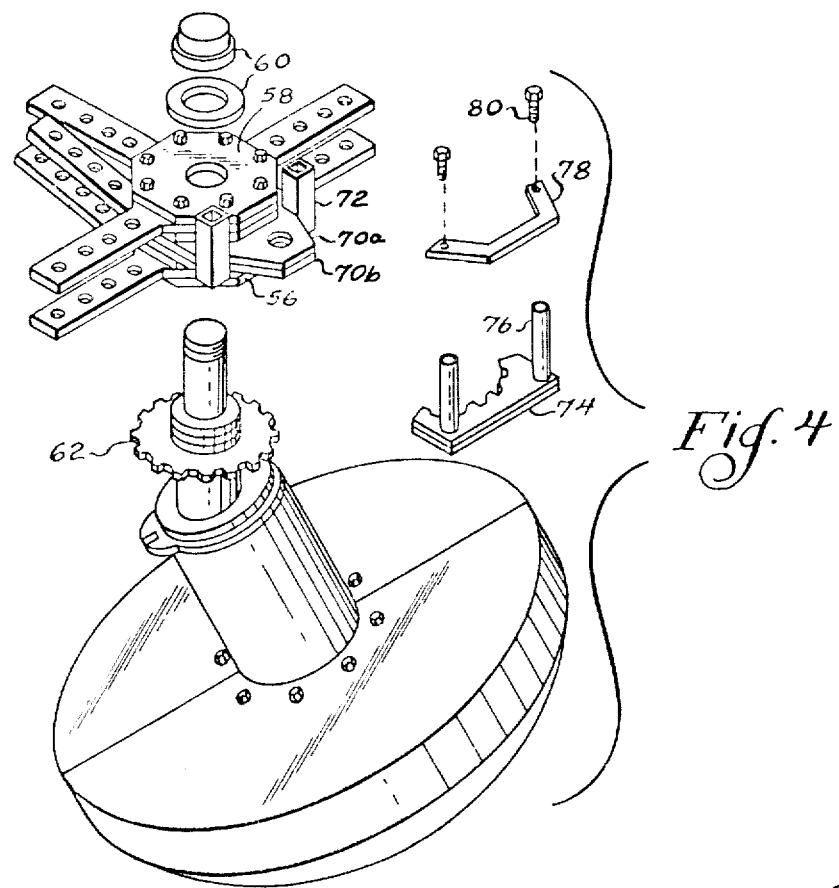
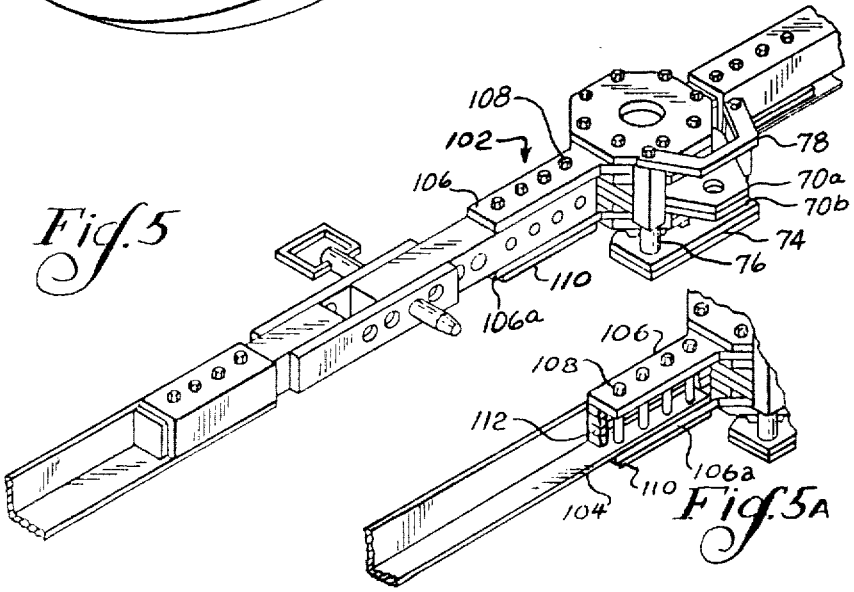

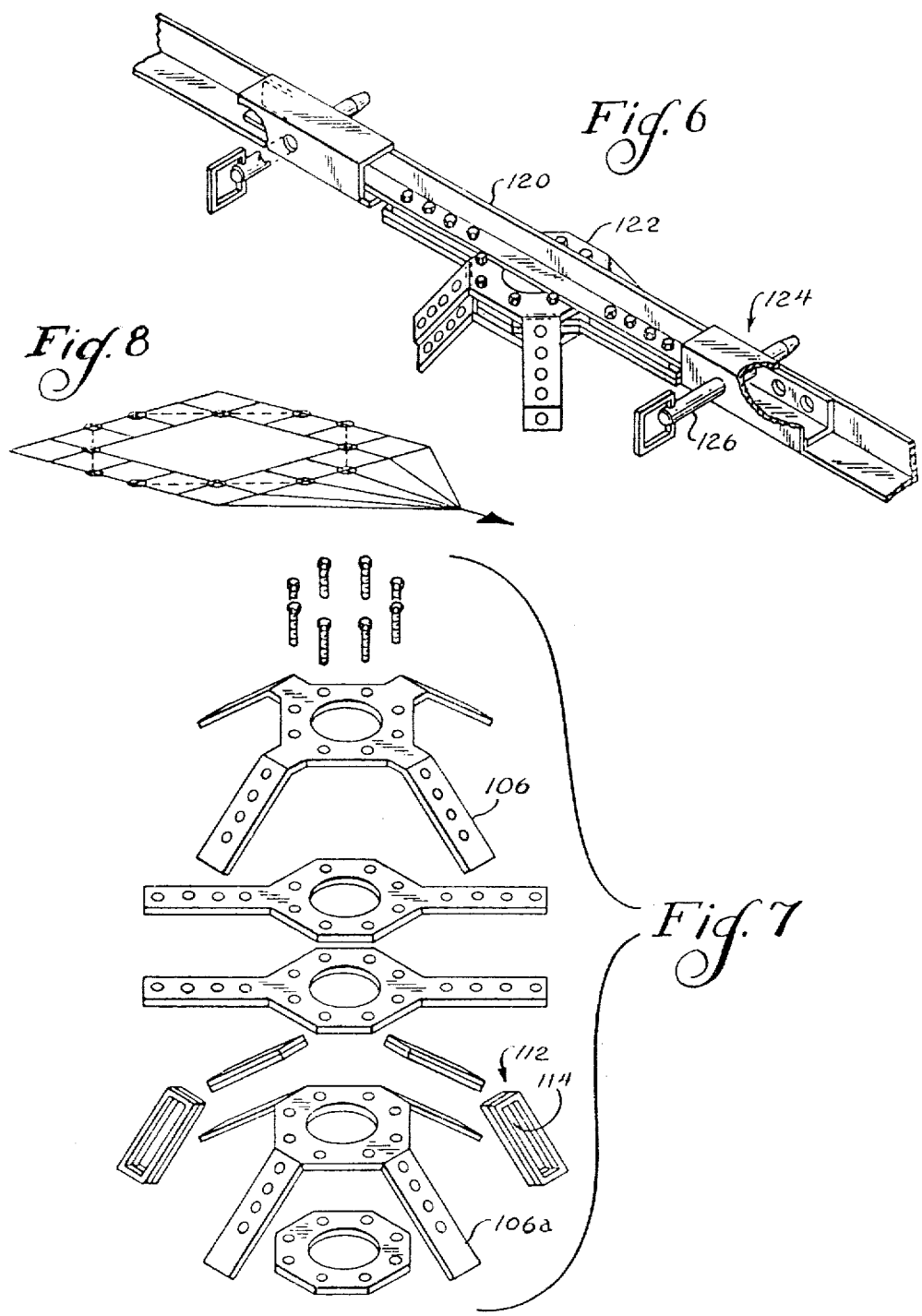

MOBILE STRUCTURE

BACKGROUND OF THE INVENTION

This invention relates generally to mobile structures for use in farm environments, and more particularly concerns mobile structures used to contain and manage farm animals. Prior art approaches, such as that disclosed by Benjamin, U.S. Pat. No. 3,724,424, April 1973, have provided mobile structures on skids which may be pulled about the farm yard and have encountered certain shortcomings in that such structures are inflexible, difficult to move, and complicated in their structure and assembly. Further, these type of inflexible structures fail to retain full contact with the ground when towed over uneven terrain.

SUMMARY OF THE INVENTION

The present invention overcomes the abovenoted shortcomings of prior art systems and provides a simplified structure using beam members and flexible joints on supporting free wheeling castors. The multiple beam assembly is comprised of flexible joints with overlapping beams joined through an intermediate block member by nut and bolt arrangement. To provide requisite mobility this structure is carried by castors arranged to rotate freely about a first axis while being selectively positioned with respect to a second axis to vary the direction of its resistance. This provides a towable structure whose supporting points articulate with uneven terrain. Accordingly, it is the primary object of the subject invention to provide a flexible structure capable of following rough terrain and maintaining the supporting points in constant contact therewith. It is a further object to provide a mobile structure which yields minimized rolling resistance during towing but may be set to yield maximized resistance in a transverse direction. Other objects and advantages of the invention will become apparent upon reading the following detailed description and appended claims, and upon reference to the accompanying drawings.

BRIEF DESCRIPTION OF THE DRAWINGS

For a more complete understanding of this invention reference should now be had to the embodiments illustrated in greater detail in the accompanying drawings and described below by way of an example of the invention. In the drawings:

FIG. 1 is a perspective view of one embodiment of the subject invention;

FIG. 2 is a schematic view of an alternative embodiment employing multiple modular units;

FIG. 3 is a sectional view of a castor assembly of FIG. 1;

FIG. 3a is a perspective view of a towing and bearing support of FIG. 3.

FIG. 4 is a partially exploded view of the castor assembly of FIG. 3 showing the pivotal locking mechanism.

FIG. 5 is a perspective view of the flexible joint of the subject invention.

FIG. 5a is a partially cut away view of the joint of FIG. 5.

FIG. 6 is a perspective view, partially cut away, of another version of the flexible joint of this invention with a telescoping beam concept.

FIG. 7 is an exploded view of a flexible joint of this invention.

FIG. 8 is a diagrammatic view of the stress pattern developed during towing of a multi modular system of FIG. 2.

While the invention will be described in connection with the preferred embodiment, it will be understood that I do not intend to limit the invention to that embodiment. On the contrary, I intend to cover all alternatives, modifications and equivalents as may be included within the spirit and scope of the invention as defined by the appended claims.

DESCRIPTION OF THE PREFERRED EMBODIMENTS

Turning first to FIG. 1 there is shown the mobile structure 10 for use as a mobile farm enclosure to contain or shelter farm animals, materials, or equipment. More particularly, the structure of FIG. 1 is comprised of a matrix of beam members 12 coupled by flexible joints at 14 and along its base at 16. The structure is arranged for improved mobility under tow by use of free wheeling castors 20. This castor assembly, shown more fully in FIG. 3, is comprised of a dual axis shaft 32 pivotally supported within upper bearings set 34. Lower bearing housing 37 is secured by bolt and weld joints 40 to a curved dish member 38 and is arranged for free rotation about roller bearing set 36. Sealing said lower bearings within bearing housing 37 is lower washer 42 and upper washers 44, 46 and 48. Upper washer 44 and secondary washers 46 and 48 are secured between sealing plate 50 and lower bearings 36. Lubricant is provided to this washer and bearing area through grease fitting 52 and reservoir maintained in periodically spaced openings 54 in the upper sealing plate 50. Under this arrangement the dish member 38 spins freely about the lower portion of shaft 32, while the entire castor and assembly may be positioned or rotated about a second axis defined by the upper portion of shaft 32, as more fully described below.

The upper roller bearings 34 of the castor assembly surround shaft 32 and are supported by lower towing plate 56 and tie down plate 58. Further sealing this bearing assembly is a threaded cap and washer combination 60. Spaced below the lower sealing plate is positioning gear 62 fixedly mounted to the dual axis shaft 32 and dish assembly. Protruding from the upper bearing assembly are dual tow plates 70a and 70b (FIG. 3a) with positioning lock guides 72 mounted upright thereon. Positioning lock 74 (FIG. 4) is slidably mounted with posts 76 arranged for reciprocal motion within square guides 72 and retained by upper retainer assembly 78 secured to posts 76 by threaded bolts 80. Posts 76 are lubricated through paths 82 from grease supplied through fitting 84 (FIGS. 3, 3a) on the upper sealing plate 58.

The beam matrix of this mobile structure is connected at major stress support points by flexible joints shown most clearly in FIGS. 5 and 5a, indicated generally by 102; and used to join either two or more beam members or a combination of beam member and bearing assemblies as depicted in FIG. 5. In principal, the overlapping beam member 104 secured to bearing assembly plate extension 106 and 106a by a bolt means 108 and thread plate 110 arrangement provide the joining capability. Separating the joined members are spacers 112 (see exploded view in FIG. 7), which are characterized by enlarged internal openings in the vicinity of the protruding fasteners 108. These openings 114 facilitate displacement of the fasteners along a horizontal direction parallel to the joined beams. In the preferred embodiment the spacer 112 maintains a slotted opening around the fasteners 108 providing a close fit along its longitudinal side to limit motion transverse thereto. Further, these openings allow space for slight movement of the fasteners in the longitudinal direction. To facilitate bending motion at the joints, spacers 112 are wafer shaped to provide reduced resistance to vertical bending while providing increased rigidity in the horizontal direction.

Referring again to FIG. 1, in the preferred embodiment of this invention these flexible joint assemblies are principally located at each castor assembly 16 and at major stress points 14 throughout the structure. As the structure is towed along the terrain and castors 20 encounter uneven terrain, the flexible structure allows the castor to rise and fall and maintain contact. On the other hand the joint design described provides increased rigidity along a horizontal direction and provides a horizontally rigid and structurally stable enclosure for towing purposes.

In a further aspect of the subject invention, a telescoping top rail, shown most fully in FIG. 6, is used to increase flexibility along the spinal support of the structure. More particularly, in FIG. 6 there is shown a fixed beam member 120 attached to an upper flexible joint 122. Joining this fixed beam member to the remainder of the spinal beam is a telescoping section 124 retained in position by a pin 126 aligned through holes in the telescoping beam sections. During transit these pins are removed to allow cooperative lengthening and shortening of this beam to provide corresponding adjustment to elevations in the terrain. Upon positioning the structure for temporary or permanent use the pin may be replaced in the retaining holes to restore structural integrity to the unit.

In a final aspect of the present invention the dish, beam, flexible joint concept is particularly adaptable to multi-unit and modular structures. Referring now to FIGS. 2 and 8 there is shown a multi-unit example incorporating a matrix using prismatoid geometry. The horizontal rigidity obtained in the present invention allows a strategic distribution of the towing stress (FIG. 8), and the combination of the flexible joints and telescoping upper beams provides necessary flexibility for a large structure to adapt to irregular terrain.

What I claim is:

1. In a mobile structure, a multiple beam joint assembly comprising:
   a. a main body member having rigidly affixed thereto a plurality of paired upper and lower plate members with aligned openings therein to accept fastener means;
   b. a plurality of beam members corresponding to said plate members and having ends thereof in overlapping relation to said paired plate members and exhibiting openings therein in substantial alignment with corresponding openings in said plate members;
   c. a block member interposed said plate and beam members and having an elongated opening therein to allow fasteners to protrude therethrough; and
   d. fasteners extending through said aligned openings securing said members into a joint assembly.

2. In a mobile structure, a flexible framework assembly comprising:
   a. first and second beam members;
   b. a first plate extension portion rigidly affixed to the first beam member and in juxtaposition with the second beam member, said first plate extension portion having a plurality of openings therein adapted to receive elongated fastener means;
   c. a second plate extension portion extending from the second beam member and affixed thereto, located in spaced relation to said first plate extension portion, and having a plurality of openings therein adapted to receive fastener means and positioned in alignment with cooperating openings in said first plate extension portion;
   d. a substantially rectangular block member interposed said plate extensions, having elongated openings extending in a first direction parallel to said beam members defined therein, to allow fasteners to protrude through the aligned openings in said plate extensions and providing a close fit against the fasteners along a first direction while providing a loose fit along a second direction; and
   e. fastener means extending through said aligned openings and said block member for securing said members into a joint assembly; and
   f. means for supporting said structure comprising a plurality of freely rotatable dish members characterized by a broad curved rolling surface arranged to provide terrain contact along selected portions of said curved surfaces.

* * * * *